United States Patent [19]

Boncoeur et al.

[11] Patent Number: 4,654,171
[45] Date of Patent: Mar. 31, 1987

[54] PROCESS AND APPARATUS FOR CONFINING THE POLLUTION OF AN ISOSTATIC PRESSING ENCLOSURE

[75] Inventors: Marcel Boncoeur; François Mandet, both of Paris; Marc Palacio, Arcueil, all of France

[73] Assignee: Commissariat a l'Energie Atomique, Paris, France

[21] Appl. No.: 673,437

[22] Filed: Nov. 20, 1984

[30] Foreign Application Priority Data

Nov. 22, 1983 [FR] France ................................ 83 18574

[51] Int. Cl.$^4$ ............................ G21F 7/04; G21F 9/36
[52] U.S. Cl. .................................. 252/626; 250/506.1; 252/633; 376/310; 376/313; 376/314; 425/405 R; 425/405 H; 436/57
[58] Field of Search ........................... 250/506.1, 507.1; 376/310, 313, 314; 252/626, 627, 633; 436/57, 59; 419/48, 49; 425/405 R, 405 H; 422/159, 62, 50, 71

[56] References Cited

U.S. PATENT DOCUMENTS

| 3,383,208 | 5/1968 | Corral | 75/214 |
| 4,061,480 | 12/1977 | Frye et al. | 252/626 |
| 4,172,807 | 10/1979 | Larker | 264/0.5 |
| 4,359,336 | 11/1982 | Bowles | 419/49 |
| 4,409,029 | 10/1983 | Larker | 264/0.5 |
| 4,448,747 | 5/1984 | Moritoki et al. | 419/49 |
| 4,524,048 | 6/1985 | Schmidt et al. | 252/626 |
| 4,537,711 | 8/1985 | Wilhelm et al. | 252/626 |

FOREIGN PATENT DOCUMENTS

| 0081074 | 6/1983 | European Pat. Off. |
| 2001994 | 10/1969 | France . |
| 2375695 | 7/1978 | France . |
| 0040783 | 1/1962 | Luxembourg . |

Primary Examiner—Stephen J. Lechert, Jr.
Assistant Examiner—Howard J. Locker

[57] ABSTRACT

Process and apparatus for confining the pollution of an isostatic pressing enclosure.

At the end of an isostatic pressing operation, a glove box is sealingly fixed above the enclosure, the plug is removed from the latter and deposited within the glove box, after which the sampling and inspection operations necessary for detecting any contamination are performed.

Application to the compression of radioactive waste by isostatic pressing.

7 Claims, 10 Drawing Figures

PROCESS AND APPARATUS FOR CONFINING THE POLLUTION OF AN ISOSTATIC PRESSING ENCLOSURE

BACKGROUND OF THE INVENTION

The present invention relates to a process for confining and limiting pollution of an isostatic pressing enclosure in the case of the processing therein of dangerous or radioactive products and when attempts are made, at the end of the pressing operation, to establish whether or not contamination has taken place.

Isostatic pressing is widely used at present for all applications where a product has to be subject to an identical pressure action in all directions. This process can more particularly be used for producing mechanical parts by compaction of a powder, for the compaction of carbon-carbon composite materials, the compaction of tungsten carbide parts, the elimination of defects in certains parts or for compacting radioactive waste before the transportation thereof to a storage location.

The principle of isostatic pressing or compression consists of depositing the material to be processed within an enclosure, into which is introduced a fluid under a high pressure, which can in certain cases be up to 6000 bars. In the case where the operation is performed hot, a furnace is installed within the enclosure and the temperature and pressure are simultaneously raised. The fluids used can be a liquid such as oil, or a neutral gas such as helium or argon or, possibly, nitrogen. The installation generally incorporates a compressor for raising the gas or liquid to the appropriate pressure. The isostatic pressing enclosure is generally shaped like a cylinder, closed at one of its ends by a fast handling plug, the different supply energies of the enclosure entering via a plug located at the other end. As the pressure prevailing in the enclosure is very high, it is necessary to protect it against radial forces which occur. For this purpose, it is possible to reinforce the enclosure wall with a coiled wire and place the same within a "mesh" shaped like a double horseshoe, within which is placed the enclosure, the shape and dimensions of the mesh being such that an accidental expulsion of the plugs is prevented. When the pressing operation is ended, simultaneously with allowing the temperature to return to the ambient temperature, the fluid contained in the enclosure is discharged through a decompression circuit, in order to bring the pressure within the enclosure to a value equal to atmospheric pressure before extracting the processed products.

A special problem arises when the isostatic pressing enclosure is used for the compacting of nuclear waste or, in general terms, toxic or dangerous products. The latter are placed within a flexible material sheath, which is itself enclosed in a container placed within the enclosure. However, during the operation, leaks or a fracture of the container can occur and the gas which has become radioactive can possibly contaminate the different parts of the enclosure, particularly the furnace and the inner walls of the latter. Moreover, the discharge of the gas through the decompression circuit can cause the contamination thereof and the pollution of the atmosphere.

At present, in order to obviate these disadvantages, the users of presses working on polluting, toxic or radioactive products, use a confinement means constituted be a very large glove box, within which is located the enclosure, the compressor or compressors supplying the same, together with the means maintaining the enclosure plug in place during the pressing operation, such as the aforementioned mesh. However, this procedure suffers from the disadvantage that, in the case of contamination, all the members within the glove box are contaminated. It is not always possible to carry out decontamination and all the means risk becoming unusable, which is very costly.

SUMMARY OF THE INVENTION

The problem of the present invention is to obviate this disadvantage by using a process and an apparatus making it possible to carry out inspections and controls by limiting contamination to a small part of the complete installation.

According to the main feature of the process according to the invention, the isostatic pressing enclosure is positioned vertically and sealed in its upper part by a plug or cover and the pressing operation takes place with the aid of a fluid introduced into the enclosure which is raised to high pressure, wherein the following stages are performed:

following an isostatic pressing operation, the fluid contained in the enclosure is discharged through a special decompression circuit;

a glove box is placed above the enclosure and has at least one face to which is fixed a flexible membrane equipped with a glove;

the glove box is sealingly fixed to a support plate integral with the enclosure, the plug being located within the glove box;

the plug is removed and it is deposited within the glove box;

the sampling and inspection operations necessary for detecting any contamination are performed.

If the operation is carried out hot, the enclosure contains a furnace and the latter is advantageously protected by an insulating sleeve. In this case, once the glove box is sealingly fixed above the enclosure and the plug has been removed, the furnace insulating sleeve is removed and deposited within the glove box before carrying out the sampling and inspection operations.

The invention also relates to an apparatus for performing this process. According to the main feature of this apparatus, it comprises:

a decompression circuit incorporating at least one pipe connected to the enclosure, said pipe being equipped with at least one decompression valve and at least one filter, as well as a glove box having at least one face to which is fixed a flexible membrane equipped with a glove, the glove box also comprising means for sealingly fixing it to a support plate integral with the enclosure and means for removing the plug and depositing it within the glove box.

If the enclosure is equipped with a furnace protected by an insulating sleeve, the glove box also has means for removing the sleeve from the enclosure and depositing it within the glove box.

Finally, it can be advantageous to provide on the decompression circuit a system of taking samples for analyses and which is fitted to a pipe connected in parallel to the main decompression pipe.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
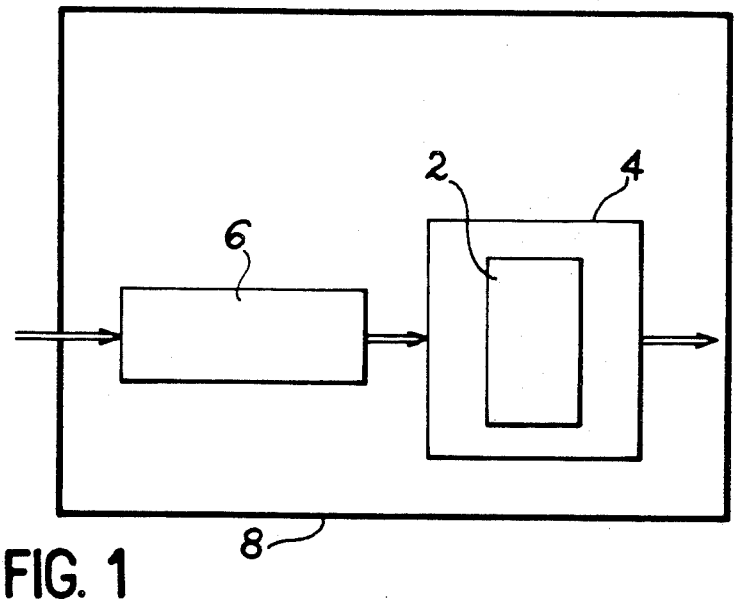
FIG. 1 a functional diagram illustrating a confinement process according to the prior art.

FIG. 1 is a diagrammatic view in elevation illustrating the prior art process, in which it is possible to see the isostatic pressing enclosure 2 within a press 4, whereby the latter can consist of a double horseshoe mesh, in the manner referred to hereinbefore. A compressor 6 supplies a pressurized fluid to enclosure 2. According to the prior art, in order to limit the pollution in the case of a leak, it is all enclosed within a very large glove box 8, which has the disadvantage in the case of contamination of the complete compressor 6, enclosure 2 and press 4 becoming unusable.

Figure 2:
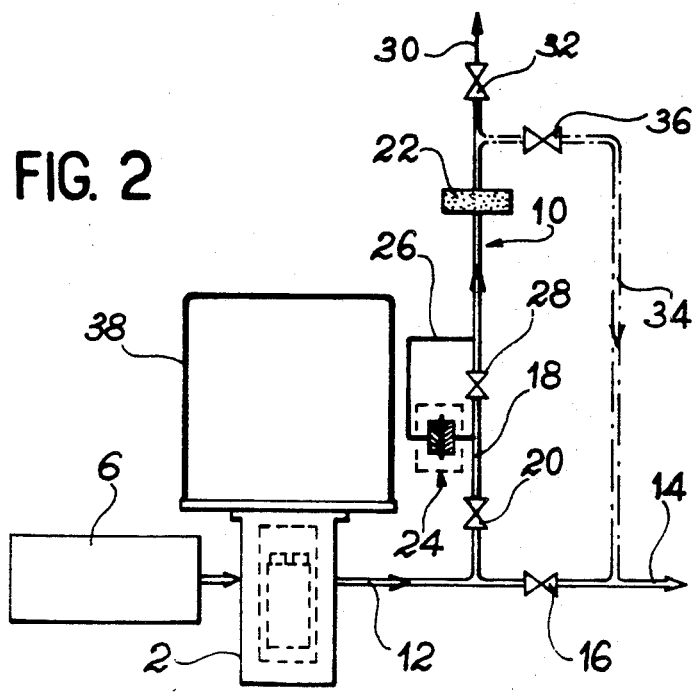
FIG. 2 a functional diagram illustrating the process according to the invention.

FIG. 2 diagrammatically illustrates the process of the invention. When it is wished to detect possible contamination of the pressing enclosure, the latter is removed from press 4 if the latter has been used. The gas contained in the enclosure is discharge through a special decompression circuit 10 and a glove box 38 is placed above the enclosure in order to carry out the necessary sampling and inspection operations.

Firstly, a description will be given of the operation of discharging the fluid with reference to FIG. 2. A decompression pipe 12 is connected to enclosure 2 and is subdivided into two other pipes, namely a pipe 14 equipped with a valve 16, which can either return the fluid into a reservoir, or discharge it into the atmosphere, which is the procedure with certain gases. This pipe is used when the enclosure is processing products not subject to a contamination hazard. In the opposite case, valve 16 is closed and valve 20 is opened and equips a pipe 18 which, with pipe 12, constitutes the decompression circuit 10. Pipe 18 is equipped with a filter 22 making it possible to stop radioactive products before discharging the gas into the atmosphere or its return to the compressor. Advantageously, it is possible to provide a sampling device 24, which essentially consists of porous stainless steel and paper filters, mounted on a pipe 26 connected in parallel to pipe 18, the closing of a valve 28 leading to the passage of the gas through pipe 26. The dust entrained by the gas is deposited on the filters and any contamination can be detected. FIG. 2 also shows that when the gas has circulated through the decompression circuit 10, it can either be discharged into the atmosphere by a pipe 30 equipped with a valve 32, or recycled into pipe 14 via a pipe 34 equipped with a valve 36.

The second stage of the process consists of bringing a glove box 38 above enclosure 2 and sealingly fixing the same to the upper part of the enclosure. Once the pressure within the enclosure has returned to a value substantially equal to atmospheric pressure, the plug closing the upper part of the enclosure is removed and is deposited within the glove box. This is followed by the sampling and inspection operations necessary for detecting any contamination. All these operations will now be described in greater detail with reference to the other drawings.

Figure 3:
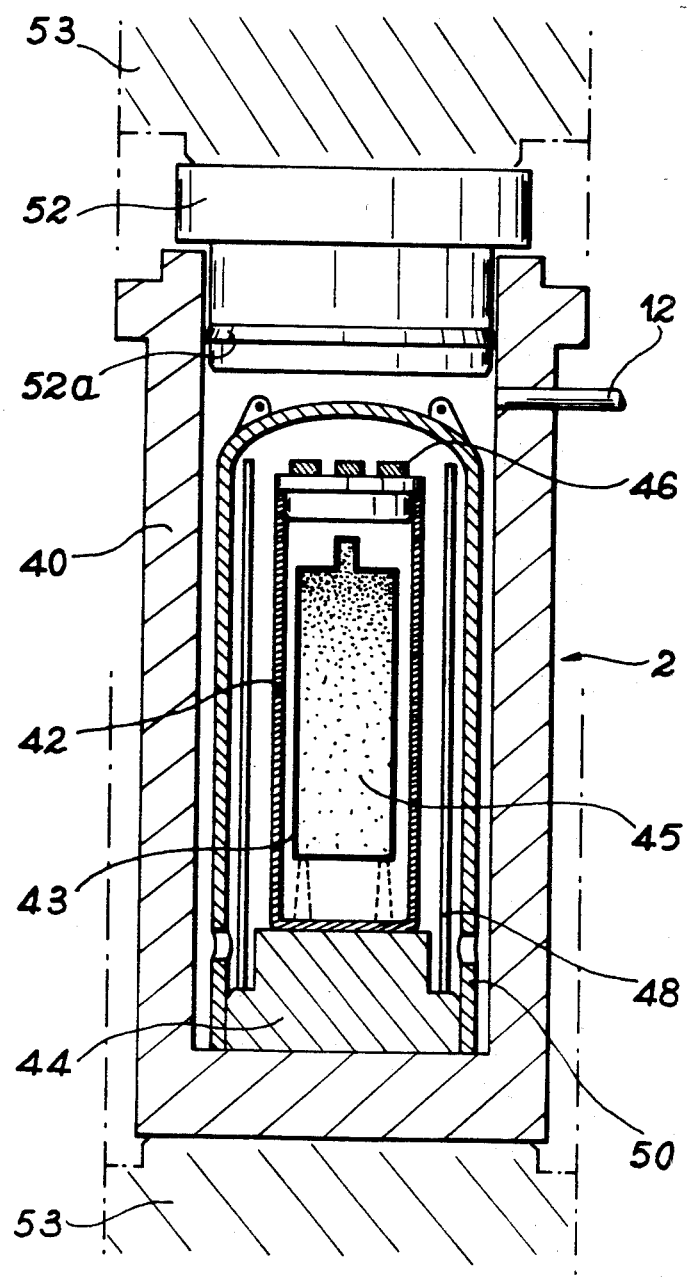
FIG. 3 a vertical sectional view of an isostatic enclosure with which it is possible to use the process according to the invention.

FIG. 3 is a diagrammatic sectional view of an enclosure which can be used with the process according to the invention but it is obvious that this process can apply to any random isostatic pressing enclosure. It can be seen that the enclosure 2 comprises a cylindrical receptacle 40 within which a container 42 rests on a base 44. Container 42, which is mainly used in the case of compacting radioactive products, is closed in its upper part by a cover equipped with filters 46 and contains a sheath 43 within which are placed the products 45 to be compacted. Sheath 43 is made from a flexible material (optionally glass or a metal, which become flexible at high temperature) and is separated by a certain space from the inner wall of container 42. Filters 46 permit the passage of the fluid during the pressure rise and stop radioactive dust during the fluid discharge phase. However, leaks can occur at the sheath, or the latter can be fractured. In the same way, there can be leaks with respect to the container, or the latter can also become fractured and it is necessary to carry out checks at the end of the operation. In the case where the isostatic pressing operation is to be carried out hot, base 44 supports a furnace 48 surrounding container 42, the furnace 48 being advantageously insulated by means of a sleeve 50. The upper part of the press 2 is closed by a plug 52, sealing being ensured by a lip joint 52a. During the pressing operation, it is maintained within a mesh 53, which is shaped like a double horseshoe constituting a ring completely surrounding the enclosure and having dimensions such that it prevents the expulsion of the plug 52 under the effect of the very high pressure prevailing within the enclosure.

Figure 4:
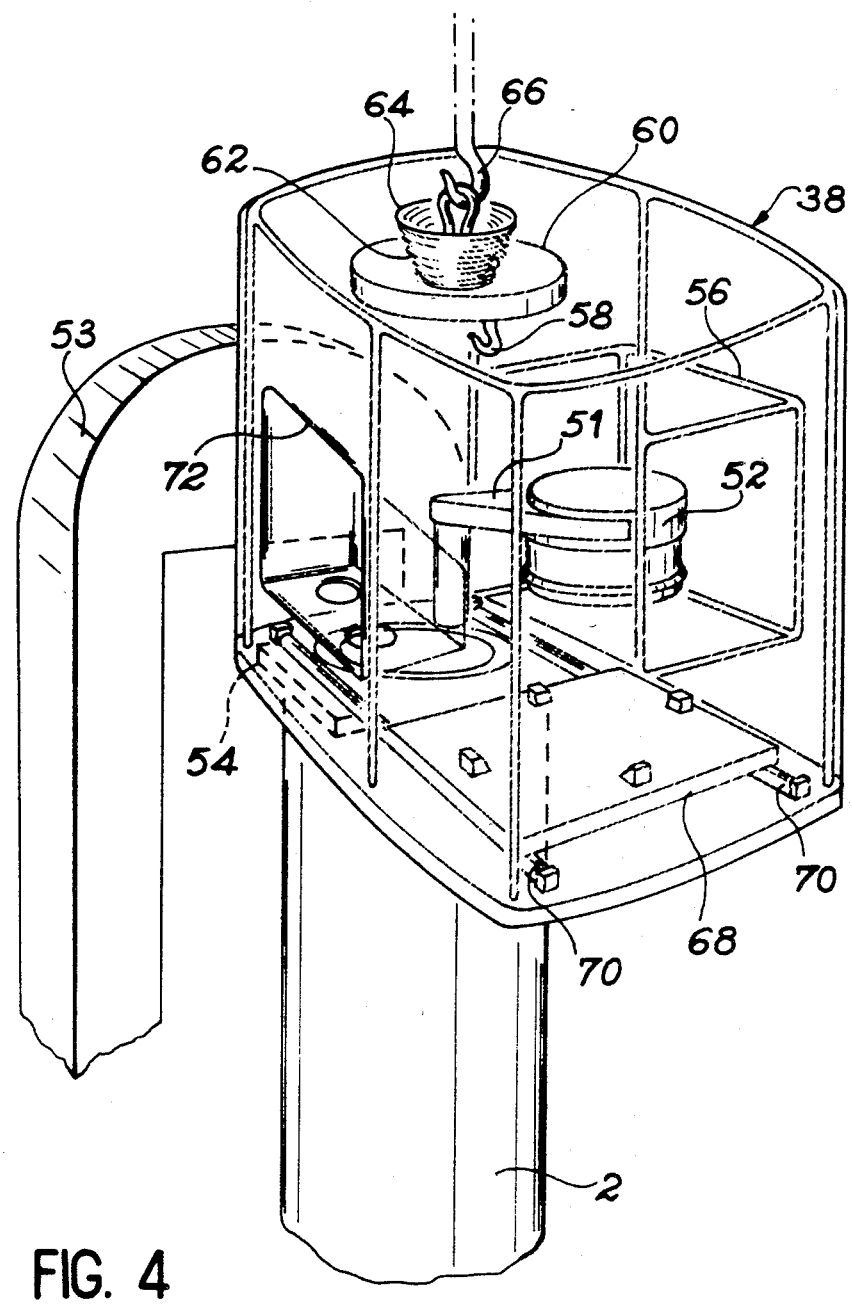
FIG. 4 a diagrammatic perspective view illustrating the glove box placed above the enclosure.

FIG. 4 shows that after a passing operation and once the gas or liquid contained in the enclosure has been discharged into the decompression circuit, enclosure 2 is removed from mesh 53, either by moving the enclosure with the mesh staying fixed, or by moving the mesh with the enclosure remaining fixed. The glove box 38 is then brought above enclosure 2 and it is sealingly fixed to a support plate 54 in the upper part of the enclosure. The shape and dimensions of glove box 38 are such that plug 52 is then located within the enclosure and can be removed by means of a mechanism 51 making it possible to grip plug 52, raise it and, after a rotary movement, deposit it within a recess 56 provided in the glove box.

If the pressing operation takes place hot, and the enclosure is equipped with a furnace 48 protected by a sleeve 50 (FIG. 3), it is necessary to remove the sleeve before carrying out the sampling operations. For this purpose, one or more hooks 58 are provided and are mounted on a circular support 60, which is itself fixed to the lower part of a bellows 62 located in the upper part of the glove box. An outer ring 64 cooperating with an outer hook 66 makes it possible to lower the support plate 60 into the enclosure and raise the insulating sleeve from the furnace. Once the furnace sleeve has been removed from the enclosure, it is necessary to free the access to the latter in order to carry out sampling and inspection operations. For this purpose, a carriage 68 moving on rails 70 is provided within the glove box. Initially, carriage 68 occupies on rail 70 a position spaced from enclosure 2, which makes it possible to remove the insulating sleeve 50 using hooks 5 after extracting plug 52. When the sleeve is extracted from the enclosure and still suspended on hook 58, carriage 68 is brought above enclosure 2, i.e. below the sleeve, and the latter is placed on the carriage. The hooks 58 are freed and the carriage carrying the sleeve is brought to its initial position. By means of a flexible membrane 72 provided on one of the sides of the glove box, it is then possible to perform the inspection operations in order to detect any contamination.

Figure 5:
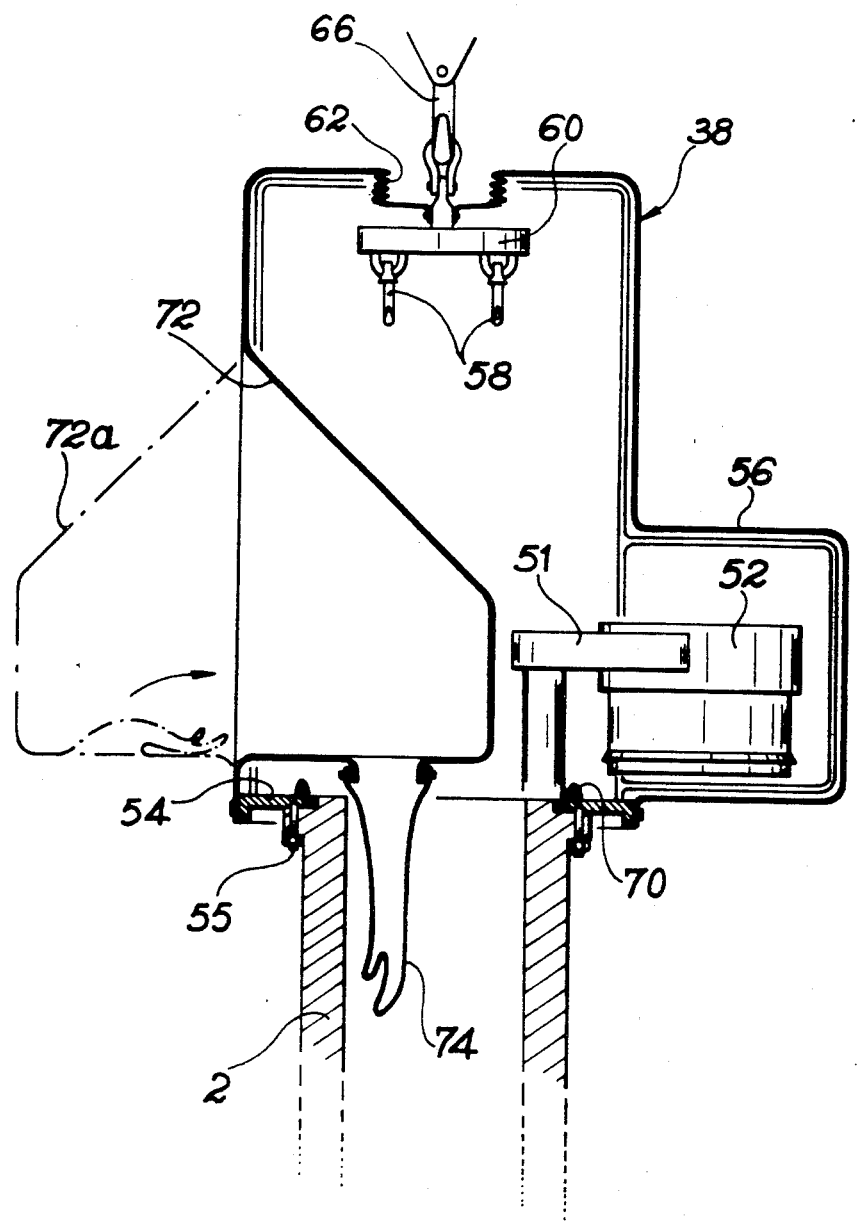
FIG. 5 a diagrammatic sectional view of the glove box used in the process according to the invention.

The shape of the membrane can best be seen from the sectional view of FIG. 5, where it is possible to see the glove box 38 fixed to a support plate 54 integral with enclosure 2 by means of screws, such as 55. It is also possible to see recess 56, in which is placed the plug 52 manipulated by means of mechanism 51. It is also possible to see support plate 60 equipped with two hooks 58 brought into its initial position once the insulating sleeve of the furnace has been removed by means of carriage 68. FIG. 5 also shows the flexible membrane 72 which, initially, is in a position 72a, external of the volume of the enclosure and which is shown diagrammatically in mixed line form in the drawing. This membrane is equipped with gloves 74 and, at the time of carrying out the inspection, the operator moves it into the enclosure up to the position shown in continuous lines and, by means of gloves 74, performs sampling operations, wipe tests, inspections and analyses necessary for detecting any pollution of enclosure 2. The dimensions of the membrane are such that an operator can carry out sampling or inspection operations at any point within the enclosure and particularly on the bottom thereof.

If no contamination is detected, the glove box is removed and the container containing the products to be processed is also removed. However, if the analyses reveal contamination, the assembly is specially processed and may be dispatched to a decontamination installation.

As a function of the degree of decontamination, the polluted elements may either be decontaminated within the glove box, or may be extracted therefrom after enclosing them in a plastic bag, which is welded in accordance with a process well known in the field of handling radioactive products. If the pollution is even more serious, it is possible to place a tent around the enclosure and carry out decontamination under the tent. Finally, in the least favourable case, but which is very unlikely to occur, if no decontamination is possible, the enclosure and special decompression circuit are evacuated.

It can be seen that the invention leads to a definite advance compared with the prior art because, in most cases, the enclosure can be decontaminated in situ. If not, it is merely necessary to replace certain elements and, in the most serious cases, the unusable parts are limited to the enclosure 2 and the special decompression circuit, i.e. pipes 12 and 18 (FIG. 2) up to filter 22, as well as the analysis device 24. This is much less costly than in the prior art processes where the complete installation was contaminated and also the time taken to manufacture the enclosure and the decompression circuit is much less than if it were necessary to manufacture the complete installation again.

Figure 6A:
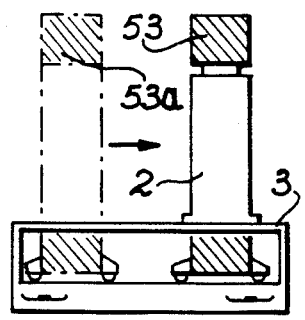
FIGS. 6a to 6e diagrammatic views in elevation illustrating the main stages of the process according to the invention.
Figure 6B:
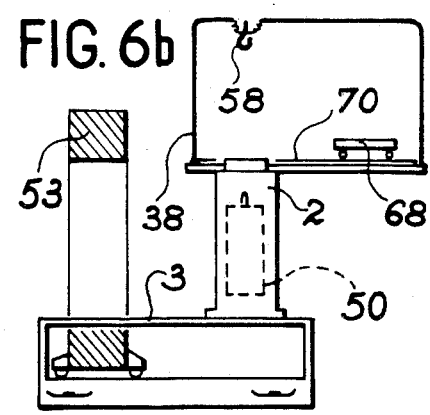
Figure 6C:
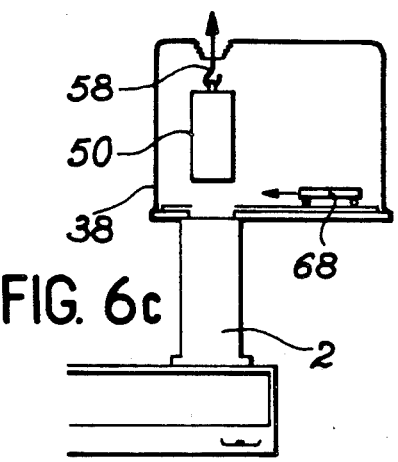
Figure 6D:
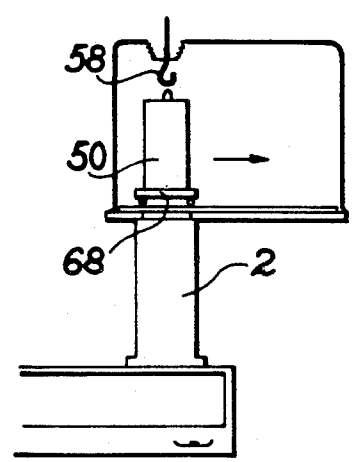
Figure 6E:
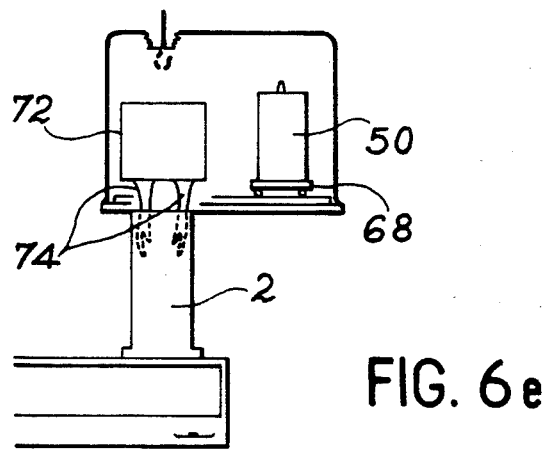

Thus, FIGS. 6a to 6e summarize the main stages of the process according to the invention. It can be seen in FIG. 6a that enclosure 2 is placed on a support 3, on which can be displaced the mesh 53. The latter initially occupies a position 53a diagrammatically represented in mixed lines and it is brought to position 53 before increasing the pressure in enclosure 2. When the pressing operation is finished, the fluid contained in the enclosure is firstly discharged through the decompression circuit and mesh 53 is returned to its initial position (FIG. 6b). The glove box 38 is then introduced and is sealingly fixed to the upper part of enclosure 2. The plug sealing the latter is then removed and then with the aid of hook or hooks 58, sleeve 50 is extracted from enclosure 2 (FIG. 6c). Carriage 68 is then brought below sleeve 50 and the latter is deposited on the carriage (FIG. 6d), which is moved to its initial position. The position of FIG. 6e is then reached, where the operator can carry out the necessary inspections within the enclosure by means of membrane 72 and gloves 74.

Thus, the process according to the invention is particularly advantageous because in the case of contamination, the latter is limited to the isostatic pressing enclosure 2 and to a small part of the discharge circuit for the fluid contained in the enclosure. In the least favourable case where the equipment cannot be decontaminated, the cost is reduced compared with the prior art processes, where the complete installation becomes unusable. Moreover, the presence of the decompression circuit with the sampling system 24 makes it possible to carry out a first contamination inspection (before fitting the glove box 38) and optionally carry out this inspection during the operation. If a contamination is detected, the pressing operation is stopped in order to carry out decontamination, which saves time.

What is claimed is:

1. A process for confining the pollution of an isostatic pressing enclosure, said enclosure being positioned substantially vertically and having an upper part comprising an opening which is sealed by a plug during an isostatic pressing operation, said enclosure being connected on the one hand to compressor means for supplying a pressurized fluid to said enclosure in order to perform an isostatic pressing operation and on the other hand to a special decompression circuit, said process comprising the following steps, carried out after an isostatic pressing operation:
    (a) discharging the fluid contained inside said enclosure into said special decompression circuit,
    (b) bringing a glove box above said enclosure, said glove box having at least one face comprising a flexible membrane equipped with at least one glove,
    (c) sealingly fixing said glove box to the upper part of said enclosure, the plug being located within the glove box, said enclosure, said compressor means and said special decompression circuit being outside said glove box,
    (d) removing the plug to provide communication between said glove box and said enclosure through said opening, and
    (e) performing the sampling and inspection operations necessary for detecting any contamination within said enclosure.

2. A process according to claim 1, wherein, when said enclosure contains a furnace protected by an insulating sleeve, said sleeve is removed from the enclosure after step (d).

3. An apparatus for confining the pollution of an isostatic pressing enclosure having an upper part comprising an opening which can be sealed by a plug, said enclosure being connected to compressor means for supplying a pressurized fluid thereto, said apparatus comprising:

a special decompression circuit comprising at least one pipe connected to said enclosure, said pipe being equipped with at least one decompression valve and at least one filter, and a glove box having at least one face comprising a flexible membrane equipped with at least one glove, said glove box further comprising:

means for sealingly fixing it to the upper part of said enclosure, the plug being inside said glove box if said opening is sealed by said plug, said enclosure, said compressor means and said special decompression circuit being outside said glove box when said glove box is sealingly fixed to said enclosure, and means for removing the plug from said opening.

4. An apparatus according to claim 3, wherein said means for removing the plug from said opening comprise:

a recess provided in said glove box and having dimensions such that said plug may be deposited within said recess, and a mechanism for grasping the plug and moving it between said opening and said recess when the glove box is sealingly fixed to said enclosure.

5. An apparatus according to claim 3, further comprising a furnace protected by an insulating sleeve, said furnace and said sleeve being inside the enclosure and the glove box further comprising means for removing the sleeve from the enclosure when the glove box is sealingly fixed to said enclosure.

6. An apparatus according to claim 5 wherein said means for removing said sleeve from said enclosure comprise:

at least one hook mounted on a bellows provided in said glove box and able to grasp said sleeve, said bellows allowing movement of the hook, when the sleeve is grasped thereon, between a first position wherein the sleeve is inside said enclosure and a second position wherein the sleeve is outside said enclosure and inside said glove box, and a carriage having such shape and dimensions so that said sleeve can be deposited thereon, said carriage being movable on rails provided inside said glove box between a first position wherein the sleeve can be deposited thereon by means of said hook and said bellows from said second position of the hook and a second position.

7. An apparatus according to claim 3, wherein said special decompression circuit further comprises:

a second pipe connected in parallel to said at least one pipe, and a sampling system for analysis mounted on said second pipe.

* * * * *